United States Patent
Wurth

(10) Patent No.: US 7,460,950 B2
(45) Date of Patent: Dec. 2, 2008

(54) SYSTEM FOR ESTABLISHING A VEHICLE PARAMETER

(75) Inventor: Lukas M. Wurth, Ebly (BE)

(73) Assignee: Delphi Technologies, Inc., Troy, MI (US)

( * ) Notice: Subject to any disclaimer, the term of this patent is extended or adjusted under 35 U.S.C. 154(b) by 794 days.

(21) Appl. No.: 10/943,584

(22) Filed: Sep. 17, 2004

(65) Prior Publication Data

US 2006/0064240 A1    Mar. 23, 2006

(51) Int. Cl.
*G01C 21/00* (2006.01)
(52) U.S. Cl. .................. 701/201; 701/29; 701/34; 701/213; 340/438
(58) Field of Classification Search .............. 701/29, 701/34, 36, 49, 79, 96, 201, 213, 215; 340/426.19, 340/438, 439, 442, 444
See application file for complete search history.

(56) References Cited

U.S. PATENT DOCUMENTS

2004/0039509 A1    2/2004   Breed ................ 701/45

*Primary Examiner*—Gertrude A. Jeanglaude
(74) *Attorney, Agent, or Firm*—Jimmy L. Funke

(57) ABSTRACT

A system for establishing a vehicle parameter including collecting signals from a satellite and deriving a reference vehicle parameter from the satellite signals. Signals from a vehicle sensor are also collected and an estimated vehicle parameter is derived therefrom. Once the satellite signals and the estimated vehicle parameter signals are collected, parameters for a correction algorithm are generated and thereafter, the correction algorithm is applied to vehicle sensor signals to generate a corrected vehicle parameter or to generate a vehicle tire status parameter.

11 Claims, 4 Drawing Sheets

SYSTEM FOR ESTABLISHING A VEHICLE PARAMETER

TECHNICAL FIELD

This application generally relates to systems for calibrating instruments and more particularly relates to systems for calibrating speed and distance measuring instruments.

BACKGROUND OF THE INVENTION

It is a common practice for vehicle manufacturers to calibrate vehicle speedometers such that they report a greater speed than that which the vehicle is actually traveling. This practice is sometimes called "positive error calibration." This approach is taken to ensure that the actual vehicle speed is never under reported by the vehicle speedometer. Although the motivation for this approach is understandable, it renders a vehicle's speedometer ineffective as a device for accurately gauging estimated time of arrival.

Like the vehicle speedometer, the vehicle odometer also suffers from lack of precision. Although the vehicle odometer is calibrated to give generally acceptable average distance measurements, it is calibrated from the rotation of one or more vehicle drive train members which ultimately are dependant upon the rotation of one or more vehicle wheels. The wheel diameter parameter is a particularly weak link in accurately determining vehicle speed and distance traversed by the vehicle in part because of its diameter is susceptible to variance due to wear, internal air pressure, vehicle loading, manufacturing tolerances, temperature, and other such factors. Thus, even if vehicle speedometers and odometers were highly accurately calibrated at the time the vehicle was new the factors mentioned above, acting on the tire over time, would erode the accuracy of the speedometer and odometer.

Thus, there is a need for an inexpensive system for continually recalibrating a vehicle's speedometer and odometer over the lifetime of the vehicle.

DETAILED DESCRIPTION OF THE INVENTION

Figure 1:
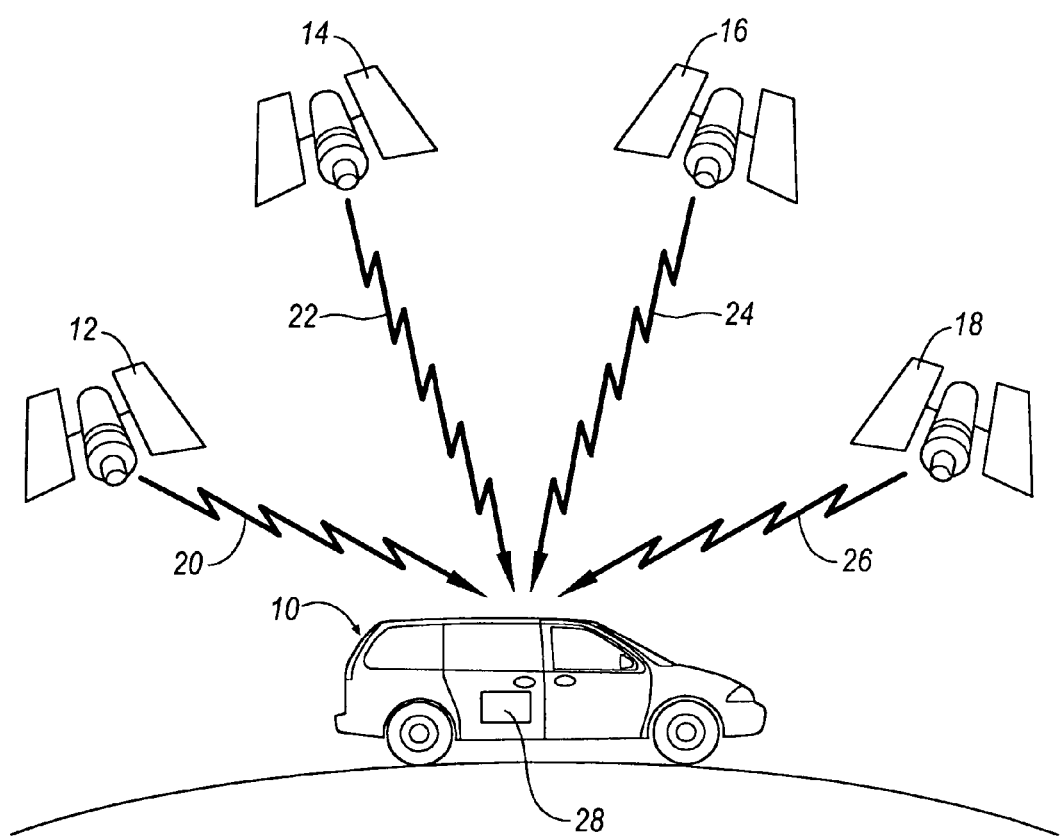
FIG. 1 is a schematic view of a vehicle which is in radio communication with four satellites which are part of the Global Positioning System (GPS)

Now referring to FIG. 1, the calibration/diagnostic system 28 of the present invention is preferably housed within vehicle 10. Calibration/diagnostic system 28 includes a Global Position Satellite (GPS) receiver (not shown) which is in constant communication with one or more satellites 12, 14, 16, 18 which are part of a larger group of 24 or more satellites that make up the Global Positioning Satellite system. Satellites 12, 14, 16, 18 communicate with the GPS receiver located within the calibration/diagnostic system by way of electromagnetic signals 20, 22, 24, and 26.

Figure 2:
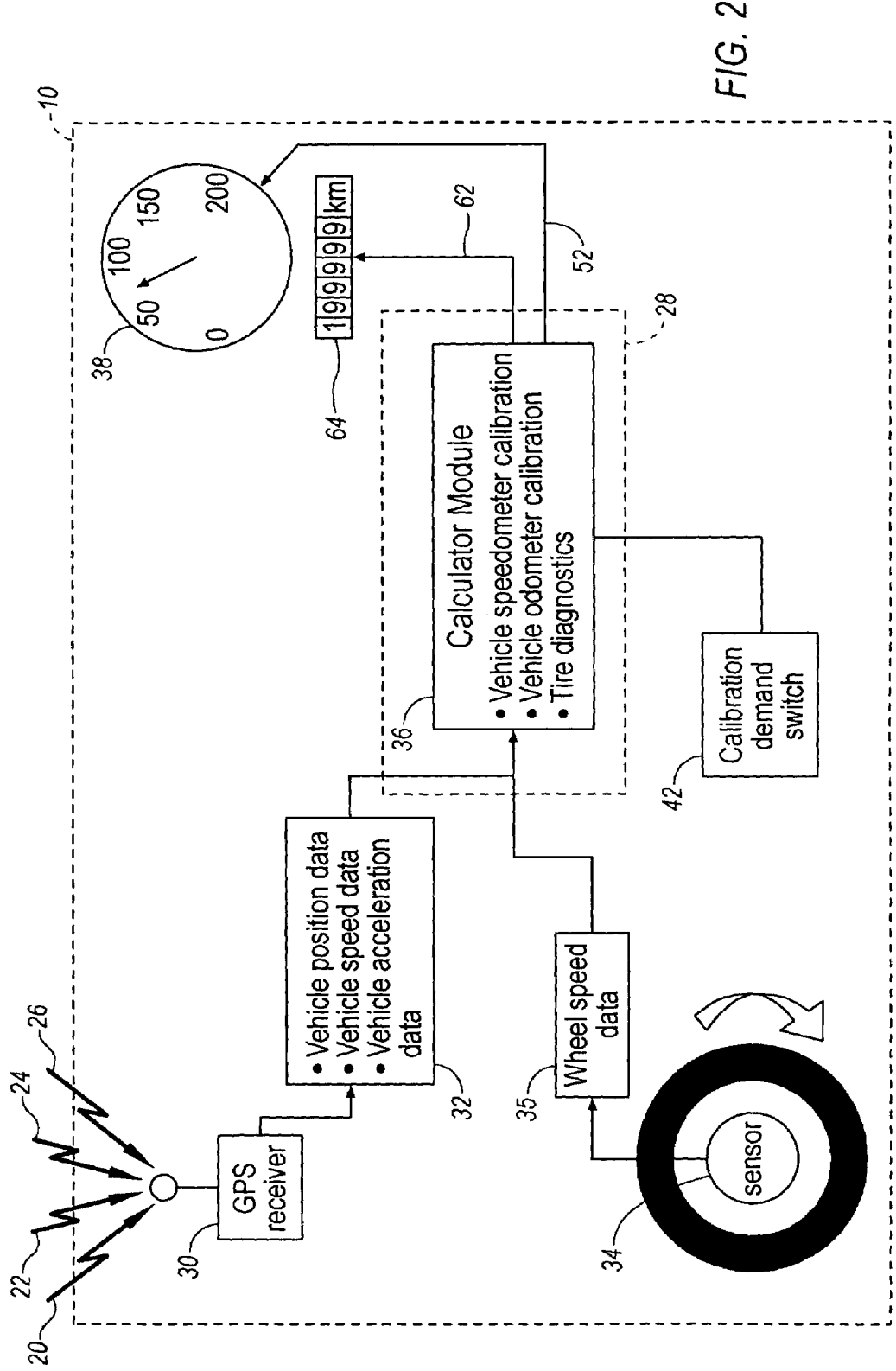
FIG. 2 is a diagrammatic view of the speedometer and odometer calibration system of the present invention.

Now referring to FIG. 1 and FIG. 2, the calibration/diagnostic system 28 of the present invention includes GPS receiver 30 which maintains radio communication with GPS satellites 12, 14, 16, 18 as has already been described. Using techniques well-known to those skilled in the art, GPS receiver 30 generates output data 32 representative of vehicle position, vehicle speed, and vehicle acceleration. This output data 32 is presented to calculator module 36. Calculator module 36 is also presented with wheel speed data 35 which is generated from wheel speed sensor 34. Wheel speed sensor 34 is typical of the wheel speed sensors used within anti-lock brake systems (ABS). Wheel speed sensor 34 is shown as a single wheel speed sensor but it is contemplated that any device capable of generating vehicle speed data (directly or indirectly) can be substituted for wheel speed sensor 34. It is also contemplated that two or more wheel speed sensors can be used in the place of single wheel speed sensor 34.

Because the vehicle speed data 32 derived from the GPS receiver 30 is much more accurate than that which can be calculated from the wheel speed sensor 34, the GPS data can be used as a calibration reference by the calculator module 36 which can easily apply one or more error correction techniques (such as using straight look-up tables, linear mapping techniques, piece-wise linear mapping techniques, or any number of other well-known error correction techniques known to those skilled in the art) to recalculate, rescale, or remap the signal sent by calculator module 36 prior to sending it to speedometer 38. This recalibration can take place automatically by calculator module 36 according to any number of schemes such as once after each vehicle startup, after every predetermined number of vehicle operating hours, or at the demand of the vehicle operator. The vehicle operator can initiate a calibration by providing the vehicle operator with a calibration demand switch 42. This demand switch 42 can be a part of the GPS receiver 30, part of the calculator module 36, or could even be a switch which is mounted on the vehicle dash panel. After the calculator module 36 applies the vehicle speed error correction algorithm to the wheel speed data 35, it outputs the corrected vehicle speed data to speedometer 38 where it is displayed to the vehicle operator using customary analog or digital instrument panel display devices.

Figure 3:
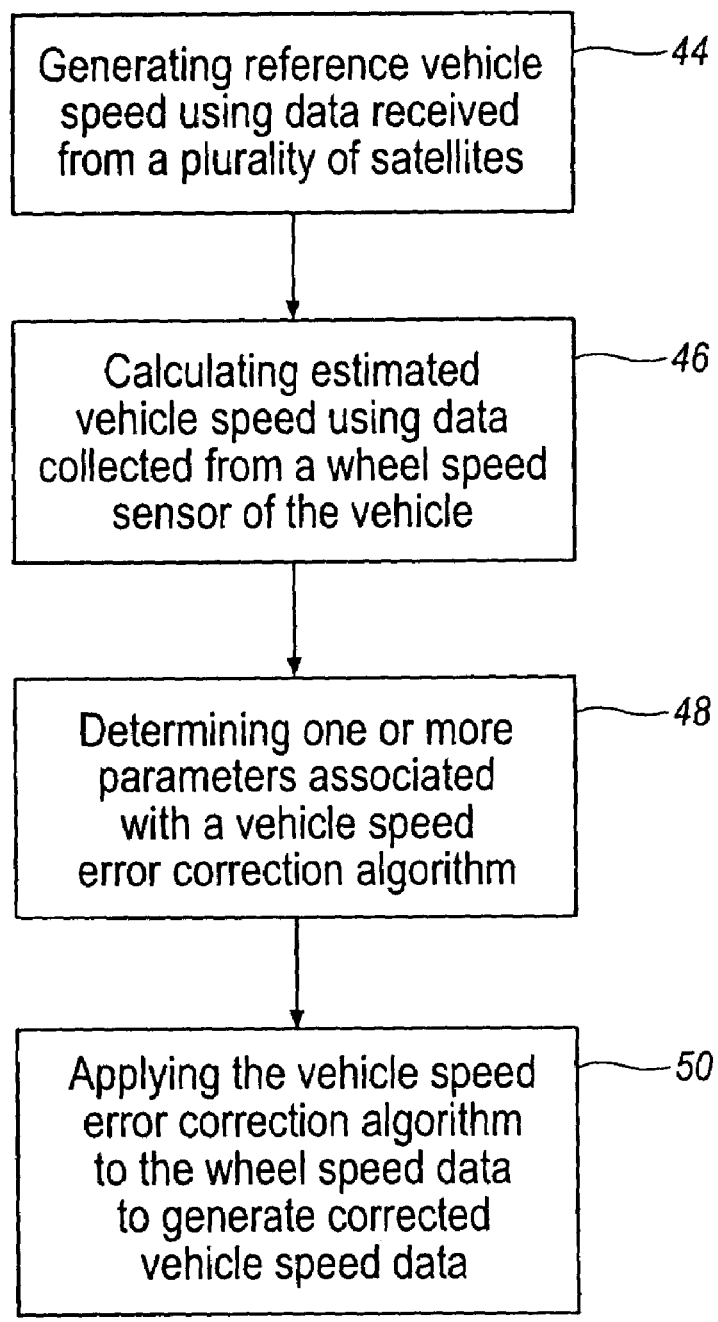
FIG. 3 is a logic flow diagram.

Now referring to FIG. 3, in a preferred embodiment, calculator module 36 includes a microprocessor for carrying out the vehicle speedometer calibration task. The first part of this task is to generate GPS reference vehicle speed data 44. In a preferred embodiment, the vehicle speed data is generated within GPS receiver 30 using conventional techniques. However, it is also contemplated that the present system can be used such that the GPS receiver 30 does not generate vehicle speed data but is used to simply receive satellite data 20, 22, 24, 26 and that "raw" data is passed along to calculator module 36 wherein the GPS reference vehicle speed information is derived from the "raw" GPS data. The second step (step 46) is to calculate the estimated vehicle speed using wheel speed data 35 collected from wheel speed sensor 34. After the GPS reference vehicle speed 44 is determined and the estimated vehicle speed 46 is collected, calculator module 36 determines one or more parameters associated with a vehicle speed error correction algorithm. Any number of well-known error correction techniques can be used for calculating the error correction parameters. Thereafter, calculator module 36 accepts in real time wheel speed data 35 and conditions it by applying the vehicle speed error correction algorithm 50 to it such that corrected wheel speed data is generated by module 36 which is then sent 52 to vehicle speedometer 38.

Figure 4:
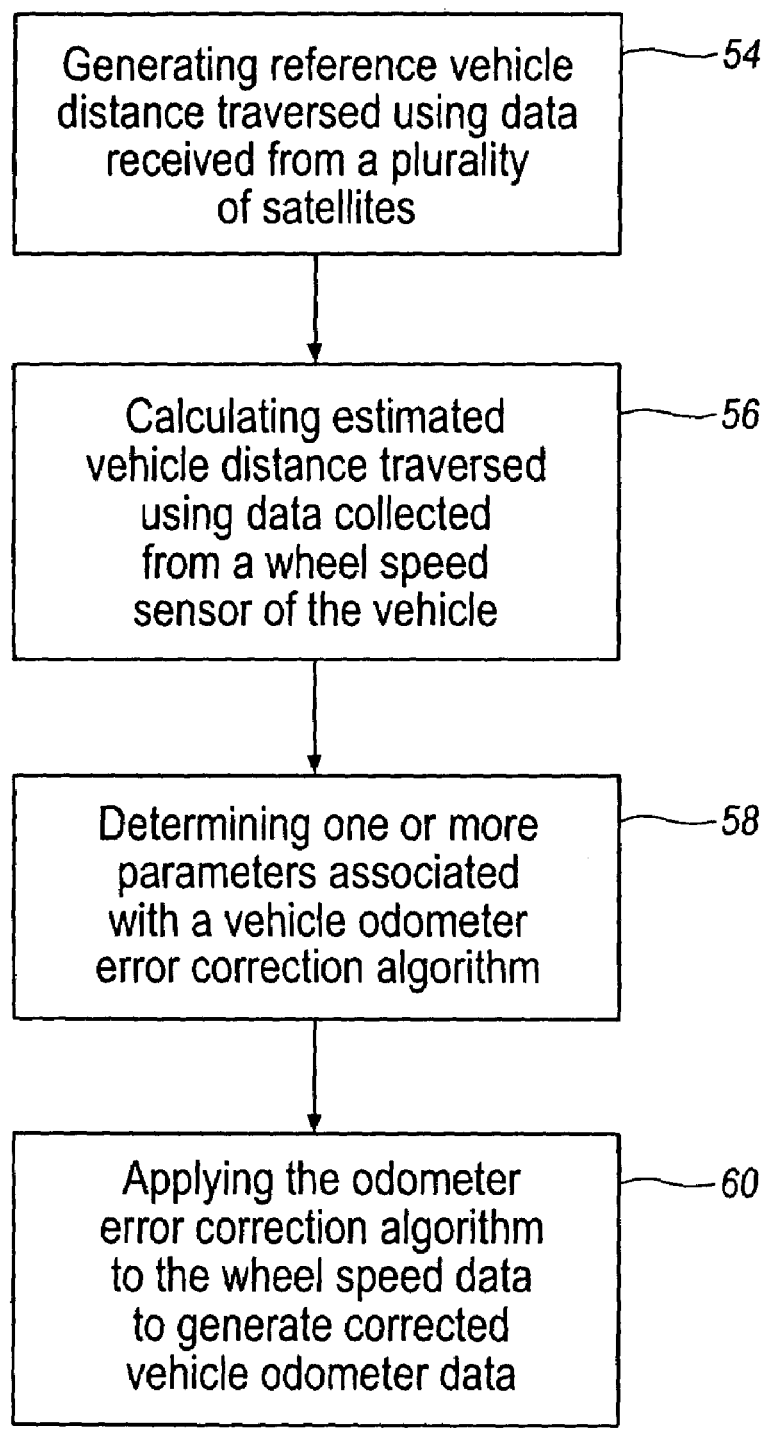
FIG. 4 is a logic flow diagram for correcting vehicle odometer data.

In a similar manner to that which has already been discussed in using a vehicle speed error correction algorithm to correct for errors in the wheel speed data 35, a similar approach can be used to correct for vehicle distance measurement errors. Specifically, now referring to FIG. 4, to correct for vehicle distance error measurements typically found in the odometer system of the vehicle, first the GPS reference distance traverse by the vehicle is generated 54 using data received from a plurality of satellites 12, 14, 16, 18. The generation of GPS reference vehicle distance is preferably carried out within GPS receiver 30; however, it is also contemplated that GPS receiver 30 could be used to simply generate "raw" GPS signals which are sent to calculator module 36 and, thereafter, calculator module 36 would be used to actually generate the GPS reference vehicle distance information based on these "raw" GPS signals. The next step, 56, includes using calculator module 36 to calculate the estimated vehicle distance traversed using wheel speed data 35 generated by wheel speed sensor 34. Once GPS reference vehicle distance 54 has been generated and estimated vehicle distance 56 has been generated, calculator module 36 can determine one or more parameters associated with a vehicle odometer error correction algorithm 58. This algorithm is then applied 60 by calculator module 36 to wheel speed signals 35 such that the odometer output signal 62 transmitted to odometer 64 is corrected for the inherent deficiencies associated with using wheel speed signal 35 to measure distance traversed by the vehicle.

It is contemplated that the present invention can be used to conduct basic tire diagnostics. For example, it is known that when a tire is under-pressurized, its effective radius is reduced. Thus, by using the system of the present invention to obtain an accurate measurement of GPS reference vehicle distance traversed and by tallying the number of wheel rotations over that same distance, it is easy to determine whether or not the tire's effective radius falls within an accepted high/low limit.

The foregoing detailed description shows that the use of GPS information can be used to accurately calibrate the speedometer and odometer of a vehicle. This approach is possible because the GPS provides a redundant, independent source of speed and distance information that is much more accurate than speed/distance information typically derived from a vehicle's wheel speed sensor. While it is understood that the present system can never eliminate the need for a wheel based speedometer system (there may be times when the GPS system cannot receive a signal or the GPS system may fail), it does provide a valuable calibration tool for establishing and accurately maintaining vehicle speed and vehicle distance measurement. It has also been shown herein that the difference between the GPS reference measurements and the estimated wheel speed sensor estimates can be used to determine the state of the tire (such as tire inflation, tire wear, or the like). This is especially true if the tire rotation parameter is frequently monitored enabling the establishment of baseline data from which all later measurements can be compared.

LIST OF REFERENCE NUMERALS

10 Vehicle
12 GPS satellite
14 GPS satellite
16 GPS satellite
18 GPS satellite
20 electromagnetic signal
22 electromagnetic signal
24 electromagnetic signal
26 electromagnetic signal
28 calibration/diagnostic system
30 GPS receiver
32 output data
34 wheel speed sensor
36 calculator module
38 speedometer
40 odometer
42 calibration demand
44 step
46 step
48 step
50 step
52 corrected wheel speed data
54 step
56 step
58 step
60 step
62 odometer output signal

What is claimed as new and desired to be protected by Letters Patent of the United States is:

1. A continuous recalibration method for a vehicle including a wheel speed sensor, comprising the steps of:
    receiving signals from a satellite,
    deriving a reference value of a vehicle motion parameter from said satellite signals,
    receiving signals from said wheel speed sensor,
    deriving a measured value of said vehicle motion parameter from said wheel speed sensor signals, and
    correcting said wheel speed sensor signals so as to bring the measured value of said vehicle motion parameter into agreement with the reference value of said vehicle motion parameter.

2. The continuous recalibration method of claim 1, wherein said correcting step includes generating a parameter for a correction algorithm using the reference value of said vehicle motion parameter and the measured value of said vehicle motion parameter.

3. The continuous recalibration method of claim 1, wherein said correcting step includes generating a look-up table.

4. The continuous recalibration method of claim 1, wherein said vehicle motion parameter includes at least one of a vehicle speed and vehicle distance traversed.

5. The continuous recalibration method of claim 1, wherein said parameter vehicle motion parameter is vehicle speed.

6. The continuous recalibration method of claim 1, wherein said vehicle motion parameter is vehicle distance traversed.

7. The continuous recalibration method of claim 1, wherein said satellite is at least one satellite in a plurality of satellites.

8. The continuous recalibration method of claim 2, wherein the step of generating a parameter for a correction algorithm includes generating parameters for a linear correction algorithm.

9. The continuous recalibration method of claim 2, wherein the step of generating a parameter for a correction algorithm includes generating parameters for a piece-wise linear correction algorithm.

10. The continuous recalibration method of claim 1, wherein said vehicle motion parameter is vehicle distance traversed, and the method includes the steps of:
    using the wheel speed sensor signals to tally a number of wheel revolutions over the reference value of vehicle distance traversed;
    determining an effective radius of a vehicle tire based on the tallied number of wheel revolutions; and
    determining a status of said vehicle tire based on said effective radius.

11. The continuous recalibration method of claim 10, wherein the determined status of said vehicle tire includes at least one of tire wear and tire air pressure.

* * * * *